United States Patent
Cohen

(10) Patent No.: US 10,630,175 B2
(45) Date of Patent: Apr. 21, 2020

(54) PSEUDO CURRENT TRACKING FOR POWER SUPPLY REGULATION

(71) Applicant: TEXAS INSTRUMENTS INCORPORATED, Dallas, TX (US)

(72) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/666,256

(22) Filed: Aug. 1, 2017

(65) Prior Publication Data

US 2018/0041118 A1 Feb. 8, 2018

Related U.S. Application Data

(60) Provisional application No. 62/370,407, filed on Aug. 3, 2016.

(51) Int. Cl.
*H02M 3/156* (2006.01)
*H02M 1/08* (2006.01)
*H02M 1/00* (2006.01)

(52) U.S. Cl.
CPC ............ *H02M 3/156* (2013.01); *H02M 1/08* (2013.01); *H02M 3/1563* (2013.01); *H02M 2001/0009* (2013.01)

(58) Field of Classification Search
CPC ................................................. H02M 3/1563
See application file for complete search history.

(56) References Cited

U.S. PATENT DOCUMENTS

| 6,147,478 | A | * | 11/2000 | Skelton | H02M 3/1563 323/284 |
| 7,388,357 | B2 | | 6/2008 | Mitter et al. | |
| 2002/0125872 | A1 | | 9/2002 | Groom et al. | |
| 2007/0182381 | A1 | | 8/2007 | Kamimura et al. | |
| 2007/0229416 | A1 | * | 10/2007 | De Oto | H05B 33/0815 345/82 |
| 2008/0042633 | A1 | * | 2/2008 | Klein | H02M 3/157 323/288 |
| 2010/0019749 | A1 | * | 1/2010 | Katsuya | H02M 1/15 323/282 |

(Continued)

OTHER PUBLICATIONS

Notification of Transmittal of the International Search Report and the Written Opinion of the International Searching Authority, or the Declaration, dated Dec. 21, 2017, 7 pages.

*Primary Examiner* — Harry R Behm
(74) *Attorney, Agent, or Firm* — Tuenlap Chan; Charles A. Brill; Frank D. Cimino

(57) ABSTRACT

A power supply circuit includes a regulation circuit that receives an input voltage and provides a regulated output voltage based on the input voltage. The regulation circuit includes a switch device having a switched output that generates a ripple current waveform in the current regulator to provide the regulated output voltage. A control circuit includes a pseudo current tracker (PCT) that is operatively coupled to the regulation circuit. The PCT receives a reference voltage and generates a ripple voltage waveform that is proportional to the ripple current waveform. The control circuit commands the switch device to generate the ripple current waveform based on the ripple voltage waveform such that the regulated output voltage approximates the reference voltage.

20 Claims, 7 Drawing Sheets

(56) References Cited

U.S. PATENT DOCUMENTS

| | | | |
|---|---|---|---|
| 2010/0253308 A1* | 10/2010 | Chiang | H02M 3/156 323/283 |
| 2010/0327836 A1* | 12/2010 | Li | H02M 3/1588 323/283 |
| 2012/0126765 A1* | 5/2012 | Stone | H02M 1/36 323/283 |
| 2012/0274296 A1* | 11/2012 | Higuchi | H02M 3/156 323/282 |
| 2014/0253056 A1 | 9/2014 | Hu et al. | |
| 2016/0006354 A1* | 1/2016 | Yamaguchi | H02M 3/1563 323/282 |
| 2017/0288543 A1* | 10/2017 | Jing | H02M 3/158 |

* cited by examiner

PSEUDO CURRENT TRACKING FOR POWER SUPPLY REGULATION

CROSS-REFERENCE TO RELATED APPLICATION

This application claims the benefit of U.S. Provisional Patent Application 62/370,407 filed on 3 Aug. 2016, and entitled PSEUDO PEAK CURRENT MODE, HYSTERETIC CONTROL OF PWM REGULATORS, the entirety of which is incorporated by reference herein.

TECHNICAL FIELD

This disclosure relates to electrical circuits, and more particularly to a power supply circuit and method to regulate an output voltage based on pseudo current tracking of a current regulator.

BACKGROUND

Switching direct current (DC)-DC regulators employ various techniques to convert a DC input voltage to a DC output voltage. A buck regulator converts a higher DC input voltage to a lower DC output voltage. A boost regulator performs the opposite function of the buck regulator by providing a higher DC output voltage that is converted from a lower DC input voltage. An example of a switching converter is a current mode converter. In this example, a controllable switch drives an inductive element that supplies current to an output load based on a switching duty cycle applied to the switch by a controller. The controller can regulate the output voltage by comparing it to a reference voltage, where the duty cycle of the switch and current in the inductor can be controlled based on the comparison.

SUMMARY

This disclosure relates to a power supply circuit and method to regulate an output voltage based on pseudo current tracking of a current regulator. In one example, a power supply circuit includes a regulation circuit that receives an input voltage and provides a regulated output voltage based on the input voltage. The regulation circuit includes a switch device having a switched output that generates a ripple current waveform in the current regulator to provide the regulated output voltage. A control circuit includes a pseudo current tracker (PCT) that is operatively coupled to the regulation circuit. The PCT receives a reference voltage and generates a ripple voltage waveform that is proportional to the ripple current waveform. The control circuit commands the switch device to generate the ripple current waveform based on the ripple voltage waveform such that the regulated output voltage approximates the reference voltage, wherein the ripple voltage waveform is proportional to the ripple current waveform if the regulated output voltage approximates the reference voltage and is not proportional if the regulated output voltage differs from the reference voltage.

In another example, a power supply circuit includes a regulation circuit that receives an input voltage and provides a regulated output voltage based on the input voltage. The regulation circuit includes a switch device having a switched output that drives a current regulator to provide the regulated output voltage in response to a control command. The switched output of the switch device generates a ripple current waveform in the current regulator to provide the regulated output voltage. A control circuit having a pseudo current tracker (PCT) is operatively coupled to the regulation circuit. The PCT receives a reference voltage and generates a ripple voltage waveform. An output circuit of the control circuit monitors the ripple voltage waveform of the PCT with respect to a peak threshold voltage to generate the control command to the switch device. The PCT generates the ripple voltage waveform to be proportional to the ripple current waveform. The control circuit commands the switch device to generate the ripple current waveform based on the ripple voltage waveform such that the regulated output voltage approximates the reference voltage, wherein the ripple voltage waveform is proportional to the ripple current waveform if the regulated output voltage approximates the reference voltage and is not proportional if the regulated output voltage differs from the reference voltage.

In yet another example, a method includes generating a ripple current waveform in a current regulator to provide a regulated output voltage in response to a control command. The method includes generating a ripple voltage waveform that is proportional to the ripple current waveform of the current regulator. The method includes controlling the regulated output voltage by commanding a switch device via the control command to generate the ripple current waveform based on the ripple voltage waveform such that the regulated output voltage approximates the reference voltage, wherein the ripple voltage waveform is proportional to the ripple current waveform if the regulated output voltage approximates the reference voltage and is not proportional if the regulated output voltage differs from the reference voltage.

DETAILED DESCRIPTION

This disclosure relates to a power supply circuit and method to regulate an output voltage based on pseudo current tracking of a current regulator. The power supply circuit includes a regulation circuit and a control circuit to provide switched pulse width modulated (PWM) control for output voltage regulation based on an input voltage. In some examples, the regulator can be a boost regulator, a buck regulator, or a buck/boost regulator. A switch device having a switched output in the regulation circuit drives a current regulator to provide the regulated output voltage in response to a control command. The switched output of the switch device generates a ripple current waveform in the current regulator to provide the regulated output voltage based on the on and off time of the switch device in response to the control command. When the switch device is on, the ripple current waveform increases since the input voltage is supplied to the current regulator via the switch. When the switch device is off, the ripple current waveform decreases per a given slope that decays over time.

The control circuit includes a pseudo current tracker (PCT) that is coupled to the regulation circuit. The pseudo current tracker is referred to as "pseudo" since it does not measure the ripple current waveform in the current regulator directly yet it emulates the current waveform by generating a ripple voltage (e.g., saw tooth voltage) that is proportional to the ripple current waveform of the current regulator when the power supply is in regulation. The PCT receives a reference voltage and generates the ripple voltage waveform that proportionally tracks the ripple current waveform of the current regulator if the output circuit is in regulation. In one example when not in regulation (e.g., the output voltage is less than the reference voltage), the control circuit commands the switch device on if the ripple voltage waveform of the PCT has a slope that rises faster than a slope of the ripple current waveform. In another example when not in regulation (e.g., the output voltage is greater than the reference voltage) the control circuit commands the switch device off if the ripple voltage waveform of the PCT has a slope that rises slower than a slope of the ripple current waveform. If the respective slopes are in proportion indicting the power supply is in regulation, the switch device is turned on for a time period approximately the same amount of time it is turned off. Overload protection can be provided in the power supply circuit to mitigate short circuit and over-current load conditions in the power supply circuit.

Figure 1:
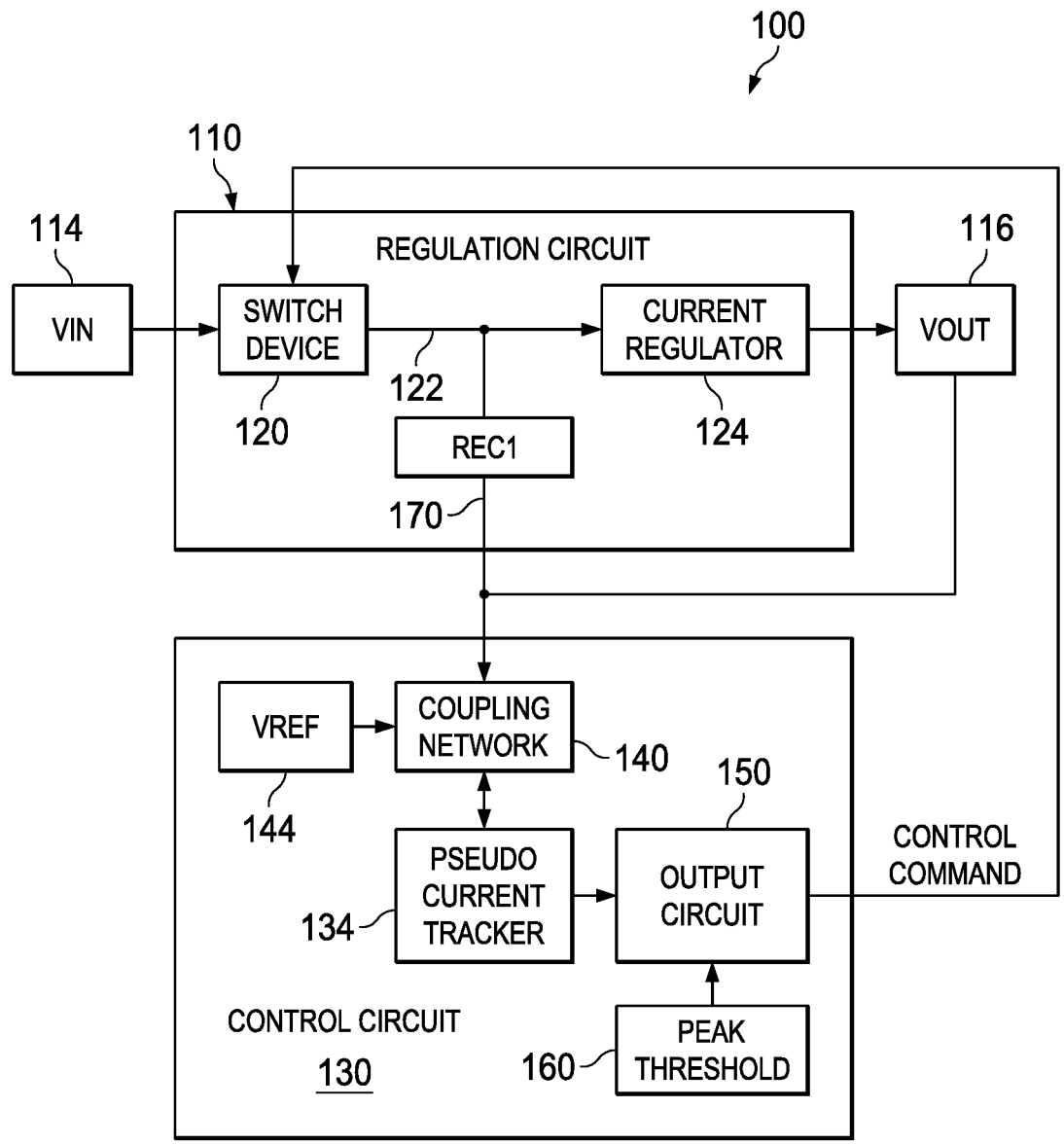
FIG. 1 illustrates an example block diagram of a power supply circuit to regulate an output voltage based on pseudo current tracking of a current regulator.

FIG. 1 illustrates an example of a power supply circuit 100 to regulate an output voltage based on pseudo current tracking of a current regulator. As used herein, the term "circuit" can include a collection of active and/or passive elements that perform a circuit function, such as an analog circuit or digital circuit. Additionally or alternatively, for example, the term "circuit" can include an integrated circuit (IC) where all or some of the circuit elements are fabricated on a common substrate (e.g., semiconductor substrate, such as a die or chip). The term "pseudo" as used herein refers to generating a signal that tracks, replicates, or emulates another signal without directly measuring or sampling the other signal. For example, the term "pseudo current tracker" refers to a circuit function that emulates a ripple current waveform of another circuit function by generating another signal that is a ripple voltage waveform. The ripple voltage waveform is not the same signal as the ripple current waveform yet it has many of the same properties such as the slope, shape, and peak-to-peak amplitude which can be utilized to regulate the circuit. Thus, the ripple voltage waveform as described herein is referred to as a pseudo version of the ripple current waveform. The ripple voltage waveform has essentially the same signal shape (e.g., saw tooth waveform) by emulating the signal shape of the ripple current waveform when the power supply circuits described herein are in regulation (e.g., the output voltage approximates reference voltage).

The power supply circuit 100 includes a regulation circuit 110 that receives an input voltage VIN 114 and provides a regulated output voltage VOUT 116 based on the input voltage. The regulation circuit 110 includes a switch device 120 having a switched output 122 that drives a current regulator 124 to provide the regulated output voltage VOUT 116. The switched output 122 of the switch device 120 generates a ripple current waveform in the current regulator 124 to provide the regulated output voltage VOUT 116. A control circuit 130 having a pseudo current tracker (PCT) 134 is operatively coupled to the regulation circuit 110 via coupling network 140. The PCT 134 receives a reference voltage VREF 144 via the coupling network 140 and generates a ripple voltage waveform that is proportional to the ripple current waveform. The control circuit 130 commands the switch device 120 to generate the ripple current waveform based on the ripple voltage waveform such that the regulated output voltage VOUT 116 approximates the reference voltage VREF 144. In an example, the PCT 134 is a capacitive device (e.g., capacitor, capacitor bank) that is driven from the coupling network 140. The current regulator 110 can include an inductive device (e.g., inductor, transformer winding) that is driven by the switch device 120 to generate the ripple current waveform.

The PCT 134 indirectly and continually tracks the ripple current of the current regulator 124 and thus does not lose track of the output voltage as is possible in some conventional current mode supplies. In this manner of pseudo current monitoring, the current in the current regulator 124 can be continually monitored to control VOUT 116 with no direct sampling of the current in the current regulator which allows efficient and responsive control of VOUT based on changes to the load current. Proportionality between the ripple voltage waveform and the ripple current waveform is maintained when the VOUT 116 approximates VREF 144. If VOUT 116 differs from differs from that of VREF 144, proportionality is not maintained until VOUT again approximates VREF when in regulation. For instance, if the regulated output voltage VOUT 116 is less than the reference voltage VREF 144, the ripple voltage waveform of the PCT 134 has a slope that rises faster than a slope of the ripple current waveform causing the control circuit 130 to command the switch device 120 to turn on. Conversely, if the regulated output voltage VOUT 116 is greater than the reference voltage VREF 144, the ripple voltage waveform of the PCT 134 has a slope that rises slower than a slope of the ripple current waveform which causes the control circuit 130 to delay turning on the switch device 120. If the respective slopes are in proportion indicting the power supply 100 is in regulation where VOUT 116 approximates VREF 144, the switch device 120 is turned on for a time period approximately the same amount of time it is turned off.

The control circuit 130 includes an output circuit 150 where the ripple voltage waveform of the PCT 134 is monitored by the output circuit to generate a control command to control the switch device 120 of the regulation circuit 110. The control command controls a duty cycle of the switch device 120 that defines the on time with respect to the off time of the device. The output circuit 150 can include a comparator and a flip flop (see e.g., FIG. 2). The comparator drives the flip flop to generate the control command to control the switch device 120. The comparator monitors the ripple voltage waveform of the PCT 134 with respect to a peak threshold voltage 140. The peak threshold voltage 160 controls the peak-to-peak amplitude of the peak ripple voltage waveform of the PCT 134 and the peak-to-peak amplitude of the peak ripple current waveform of the current regulator 110. The output circuit 150 can include another comparator (see e.g., FIG. 2) that monitors the ripple voltage waveform with respect to ground to generate a reset signal to the flip flop which turns the switch device 120 off.

A rectifier REC1 is coupled to the switched output 122 and discharges current from the current regulator 110 when the switch device 120 is off. The rectifier REC1 can be a diode or a synchronous rectifier, for example. As shown, the coupling network 140 connects the regulation circuit 110 to the control circuit 130. The coupling network 140 includes a first resistor (see e.g., FIG. 2) that couples a node 170 of the rectifier REC1 and a negative node of the regulated output voltage VOUT 116 to the PCT 134. The coupling network 140 also includes a second resistor that couples the reference voltage VREF 144 to the PCT 134 where the negative node of the regulated output voltage drives current though the first resistor when the switch device 120 is on. The first and second resistor of the coupling network 140 can be set about equal in resistance value to set the regulated output voltage VREF 116 about equal to the reference voltage VREF 144. The first and second resistor of the coupling network 140 can be set to different values to scale the regulated output voltage different than the reference voltage. An overload comparator (see e.g., FIG. 5) can be provided to monitor the node 170 of the rectifier REC1 with respect to ground. The overload comparator controls a gate that controls turn on of the switch device 120 where the switch device turns on if the node 170 of the rectifier REC1 becomes positive which represents when the ripple current waveform of the current regulator is at about zero amperes. The regulation circuit 110 and the control circuit 130 can be configured as a buck regulator, a boost regulator, or a buck/boost regulator.

An overload comparator (see e.g., FIG. 5) can be provided to monitor the node 170 of the diode D1 with respect to ground. The overload comparator controls a gate that controls when the switch device 120 turns on. The switch device 120 turns on when the node 170 of the diode D1 becomes positive which represents when the ripple current waveform of the current regulator 124 is about zero amperes. The overload comparator mitigates short circuits and over-load current that is requested from VOUT 116. The regulation circuit 110 and the control circuit 130 can be configured as a buck regulator, a boost regulator, or a buck/boost regulator, for example.

Figure 2:
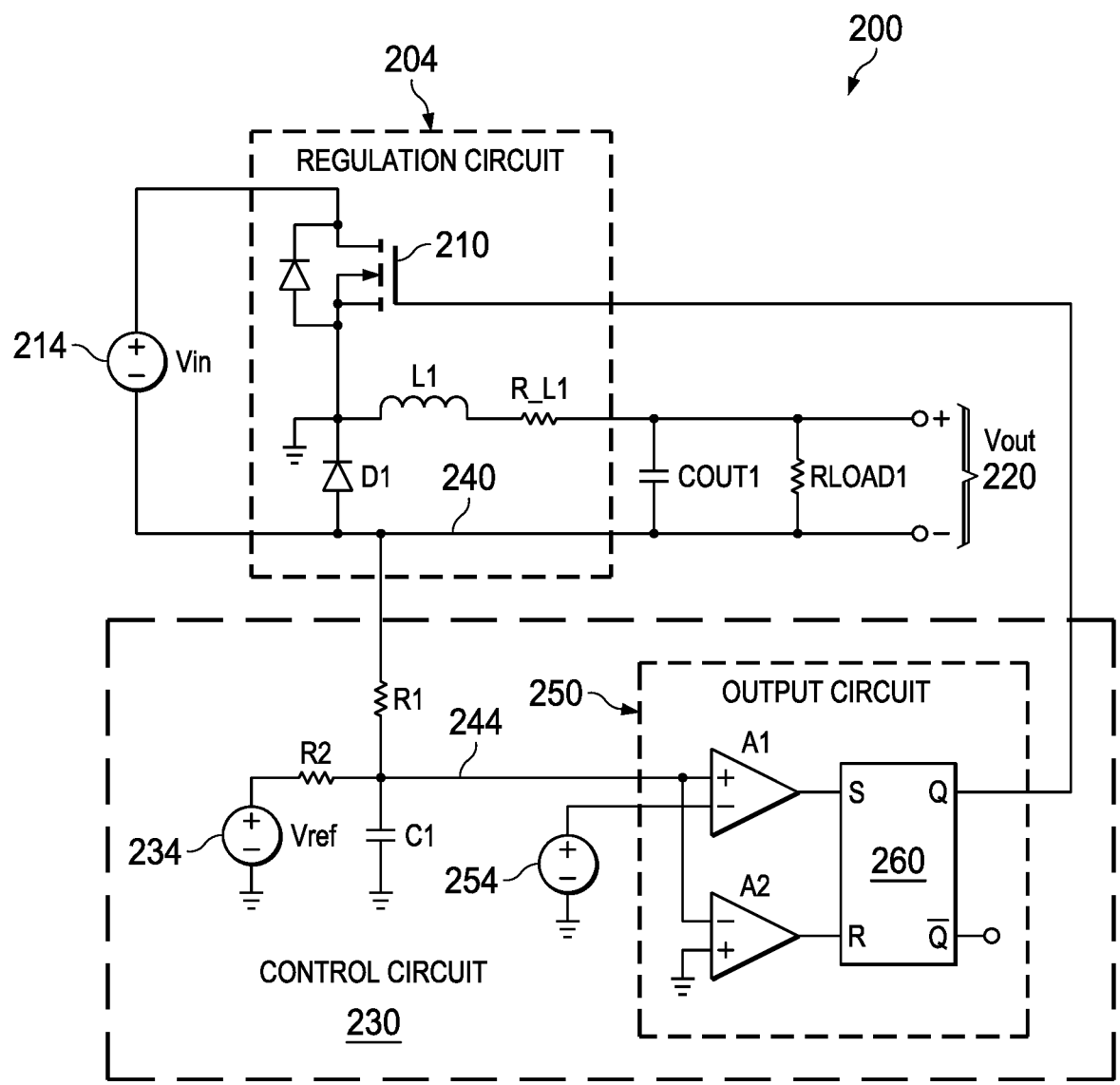
FIG. 2 illustrates an example circuit implementation of a power supply circuit to regulate an output voltage based on pseudo current tracking of a current regulator.

FIG. 2 illustrates an example circuit implementation of a power supply circuit 200 to regulate an output voltage based on pseudo current tracking of a current regulator. The circuit 200 includes a regulation circuit 204 having a switched device 210 (e.g., metallic oxide field effect transistor, bipolar transistor) that switches an input voltage VIN 214 through a current regulator 216 to generate a regulated output voltage VOUT 220. The current regulator 216 includes an inductor L1 which is modeled with series resistance shown as R_L1 to drive load components COUT1 and RLOAD1. A diode D1 is driven by the switch device 210 and coupled to L1 at a switched output 224 representing a ground node that is in common to ground connections of a control circuit 230. A coupling network comprising R1 and R2 couples a reference voltage VREF 234 and a node 240 of the regulation circuit 204 to a pseudo current tracker (PCT) shown as capacitor C1 at node 244. An output circuit 250 monitors the node 244 of the PCT capacitor C1 via comparator A1 and A2 with respect to a peak threshold voltage 254. Output from A1 and A2 drive a flip flop 260 to generate a control command to the switch device 210.

If VREF 234 is about equal to the desired output voltage VOUT 220, then switch device 210 is on, where PCT capacitor C1 is being discharged by a current proportional to the difference between the input and output voltages (Vin/R1−Vout/R2) until the voltage at node 244 reaches ground and comparator A2 resets flip-flop 260, causing switch device 210 to turn off. If the peak voltage threshold 254 is <<VOUT 220, PCT capacitor C1 can now be charged with a current proportional to the desired output voltage (VREF/R2) until the voltage at node 244 reaches the threshold 254 and comparator A1 sets the flip flop 260, turning switch device 210 on and causing the cycle to repeat. Consequently, the circuit 200 can oscillate between on and off states to maintain a current in the inductor L1 that has a peak-to-peak ripple proportional to the peak-to-peak voltage on the PCT capacitor C1 (which is about equal to peak threshold voltage 254). The circuit 200 can regulate the output voltage VOUT 220 of the converter to a value that is slightly lower than the reference voltage VREF 234, where VOUT approximates VREF.

If the load RLOAD1 increases and causes the output voltage VOUT 220 to drop below VREF 234, the up slope of the voltage on the PCT capacitor C1 should be faster than that of the inductor current of L1, thus switch device 210 should turn on. Consequently, the average current of the inductor L1 should increase, causing the output voltage VOUT 220 to increase until it becomes about equal to VREF 234 and the circuit 200 reaches steady state with the output voltage regulated to that of VREF. If the load RLOAD1 decreases, the output voltage VOUT 220 should increase and track closer to the value of VREF 234. Consequently, the current in the inductor L1 should reaches a minimum value before the voltage on PCT capacitor C1 reaches the peak threshold voltage 254, where diode D1 stops conducting and the current charging capacitor C1 should drop to a low value, thus delaying setting of the flip flop 260 and turning on the switch device 210. Thus, the average current in the inductor L1 should decrease to a value to maintain a small difference between VOUT 220 and VREF 234.

Figure 3:
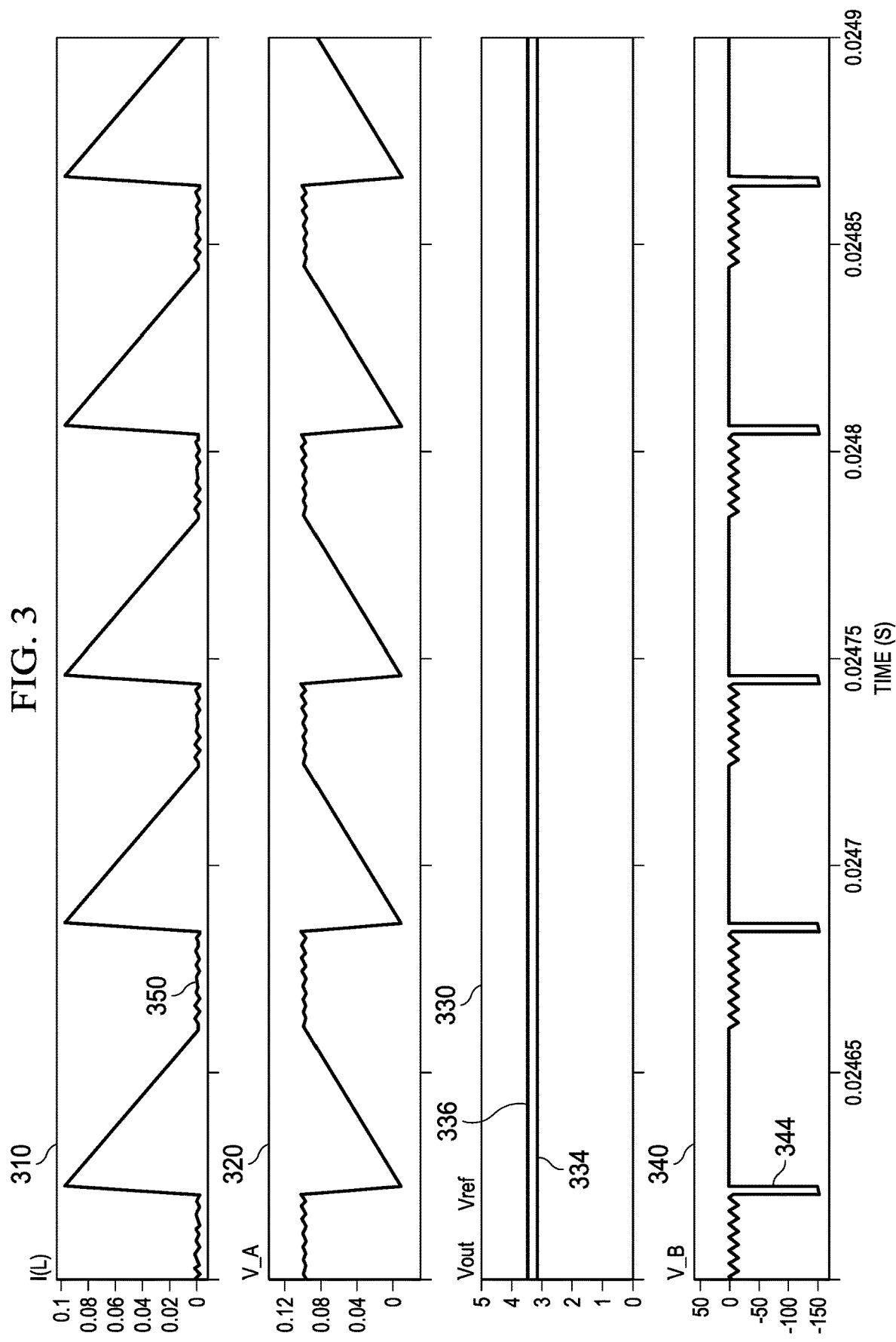
FIG. 3 illustrates example waveforms representing discontinuous conduction mode (DCM) for the circuit of FIG. 2.

FIG. 3 illustrates example waveforms representing discontinuous conduction mode (DCM) for the circuit of FIG. 2. As used herein the term discontinuous mode refers to periods of time where the inductor current described herein remains at a steady state value and the ripple voltage described herein remains fixed at some fixed DC value for the same period of time. FIG. 3 includes an inductor waveform 310 which shows inductor current on the vertical axis with respect to time on the horizontal axis. A waveform 320 shows a PCT ripple voltage waveform that emulates that of the inductor current waveform 310. Diagram 330 shows that the regulator of FIG. 2 is in regulation where an output voltage VOUT at 334 is maintained slightly below that of reference voltage shown at 336. Diagram 340 shows a switch on signal 344 to the switch device 210 of FIG. 2 where the inductor current reaches its peak value and the PCT voltage of 320 is reset to about zero. Although the waveform of 310 and 320 are inverted from each other, the waveform 320 representing ripple voltage substantially tracks and emulates the waveform 310 representing inductor current (e.g., waveforms 310 and 320 are substantially proportional to each other). A discontinuous period for inductor current is shown at 350.

Figure 4:
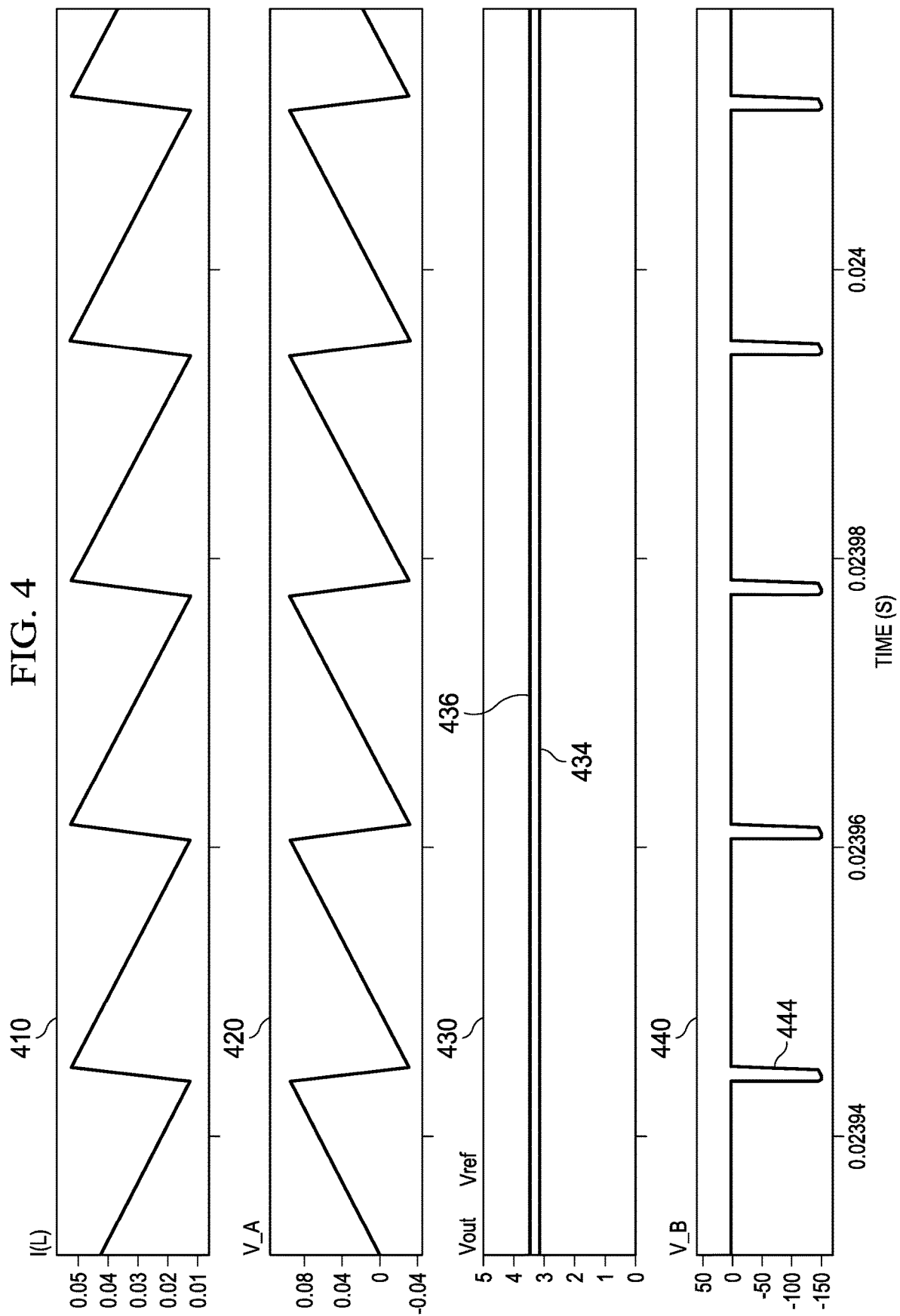
FIG. 4 illustrates example waveforms representing continuous conduction mode (CCM) for the circuit of FIG. 2.

FIG. 4 illustrates example waveforms representing continuous conduction mode (CCM) for the circuit of FIG. 2. As used herein the term continuous mode refers to periods of time where the inductor current described herein is changing and does not reach a steady state value like the discontinuous mode described for FIG. 3. Similar to FIG. 3, FIG. 4 includes an inductor waveform 410 which shows inductor current on the vertical axis with respect to time on the horizontal axis. A waveform 420 shows a PCT ripple voltage waveform that emulates that of the inductor current waveform 410. Diagram 430 shows that the regulator of FIG. 2 is in regulation where an output voltage VOUT at 434 is maintained slightly below that of reference voltage shown at 436. Diagram 440 shows a switch on signal 444 to the switch device 210 of FIG. 2 where the inductor current reaches its peak value and the PCT voltage of 420 is reset to about zero. Although the waveform of 410 and 420 are inverted from each other, the waveform 420 representing ripple voltage substantially tracks and emulates the waveform 410 representing inductor current (e.g., waveforms 410 and 420 are substantially proportional to each other). As shown, the inductor current of 410 is continuously switched between some maximum and minimum current value but does not reach a steady state value. The ripple voltage waveform 420 substantially tracks the waveform 410 as shown.

Figure 5:
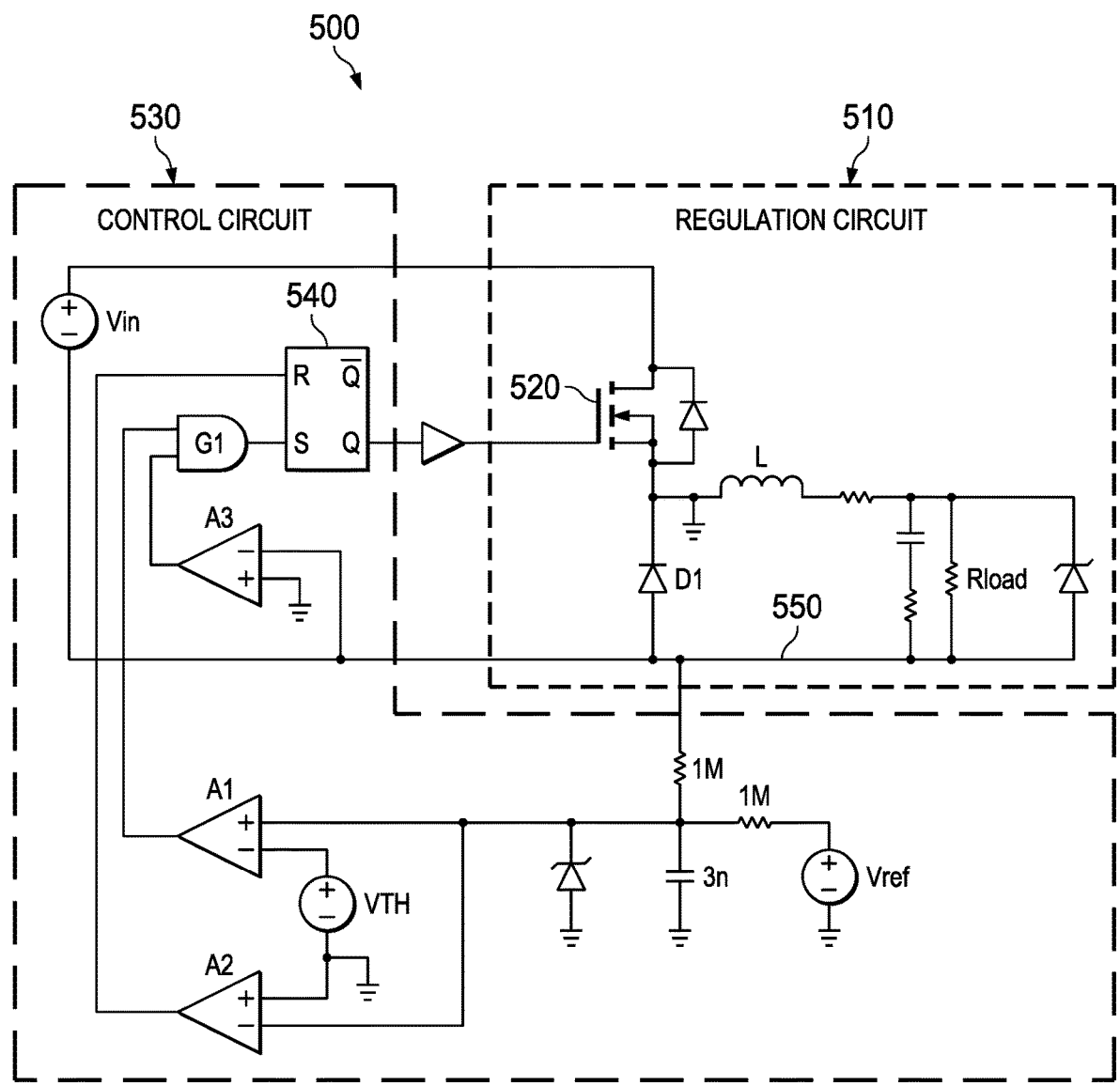
FIG. 5 illustrates an example circuit implementation of a power supply circuit to regulate an output voltage based on pseudo current tracking of a current regulator where output overload protection is provided.

FIG. 5 illustrates an example circuit implementation of a power supply circuit 500 to regulate an output voltage based on pseudo current tracking of a current regulator where output overload protection is provided. The circuit 500 includes a regulation circuit 510 having a switch device 520 that is controlled via a control circuit 530. For purposes of brevity and since there are similarities to the circuit described with respect to FIG. 2, each component of the circuit 500 will not be described. As shown, the control circuit 530 includes comparators A1 and A2 to generate set and reset command signals to a flip flop 540 to respectively set and reset the switch device 520. In this example however, an overload comparator A3 is provided to monitor a node 550 of diode D1 with respect to ground. The comparator A3 controls a gate G1 (e.g., AND gate) that controls when the switch device 520 turns on. The switch device 520 turns on when the node 550 of the diode D1 becomes positive which represents when the ripple current waveform of the current regulator described herein is about zero amperes.

Since the peak-to-peak inductor current ripple can be set without the need of direct sensing of the inductor current, the converter 500 can be protected against overload and short-circuit by forcing the mode of operation of the converter under overload conditions. For example, continuous conduction mode (CCM) operation can be forced by allowing the switch device 520 to turn on after the inductor current drops to zero. This can be achieved by sensing the voltage at node 550, which is negative (equal to the forward drop of the rectifier D1) for as long as the inductor carries current and then allowing the switch device 520 to turn on after the node 550 becomes positive (e.g., the inductor current drops to about zero).

Figure 6:
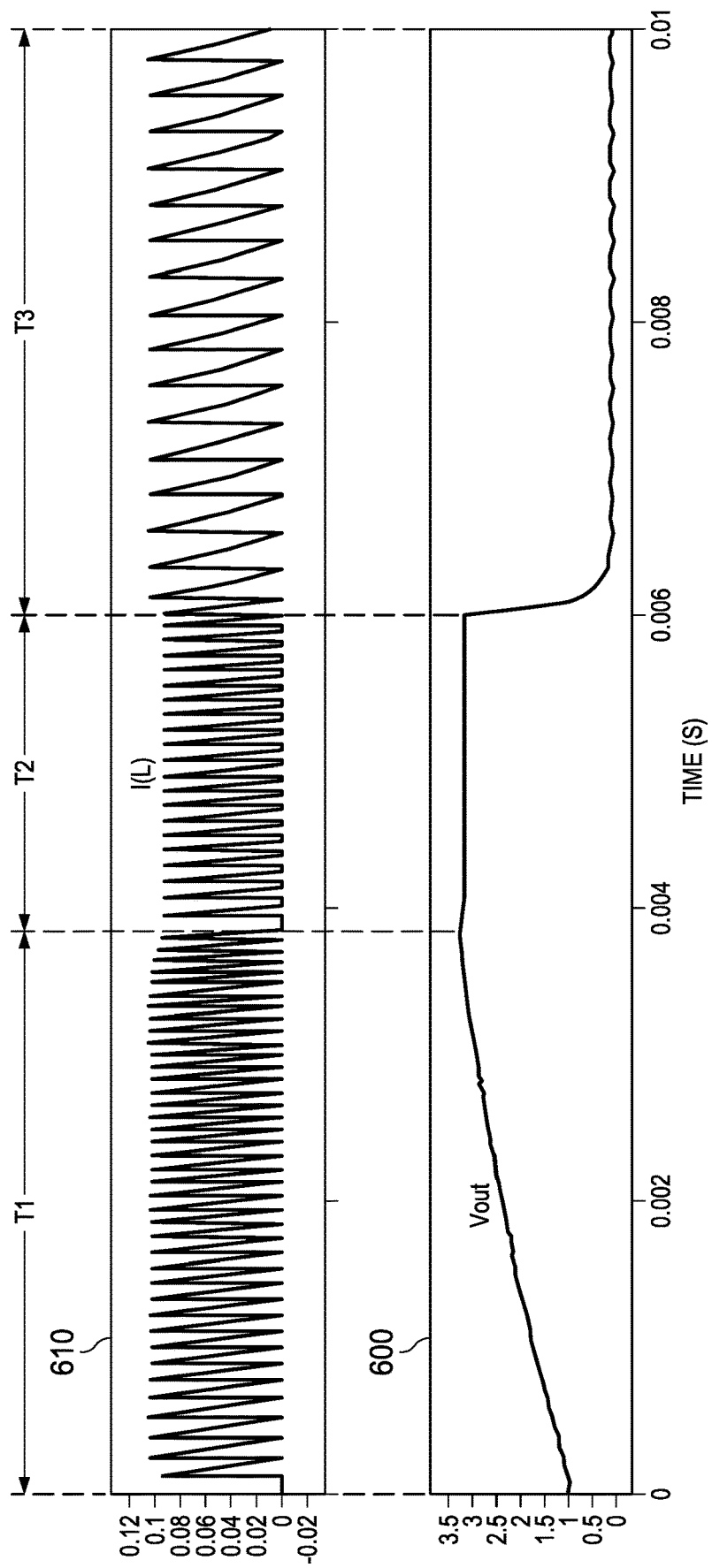
FIG. 6 illustrates example waveforms for the circuit of FIG. 5.

FIG. 6 illustrates example waveforms for the circuit of FIG. 5. During initial startup of the converter, a waveform diagram 600 shows the output voltage increasing during period T1. Also during this time T1, inductor current is shown at diagram 610. At time period T2, the output voltage of the diagram 600 reaches steady state with the corresponding inductor current diagram 610 operating in discontinuous mode as previously described. At time period T3, the output voltage VOUT is short circuited in the diagram 600, where the inductor current is switched in to continuous conduction mode (CCM) in the diagram 610 by the overload circuit described in FIG. 5.

Figure 7:
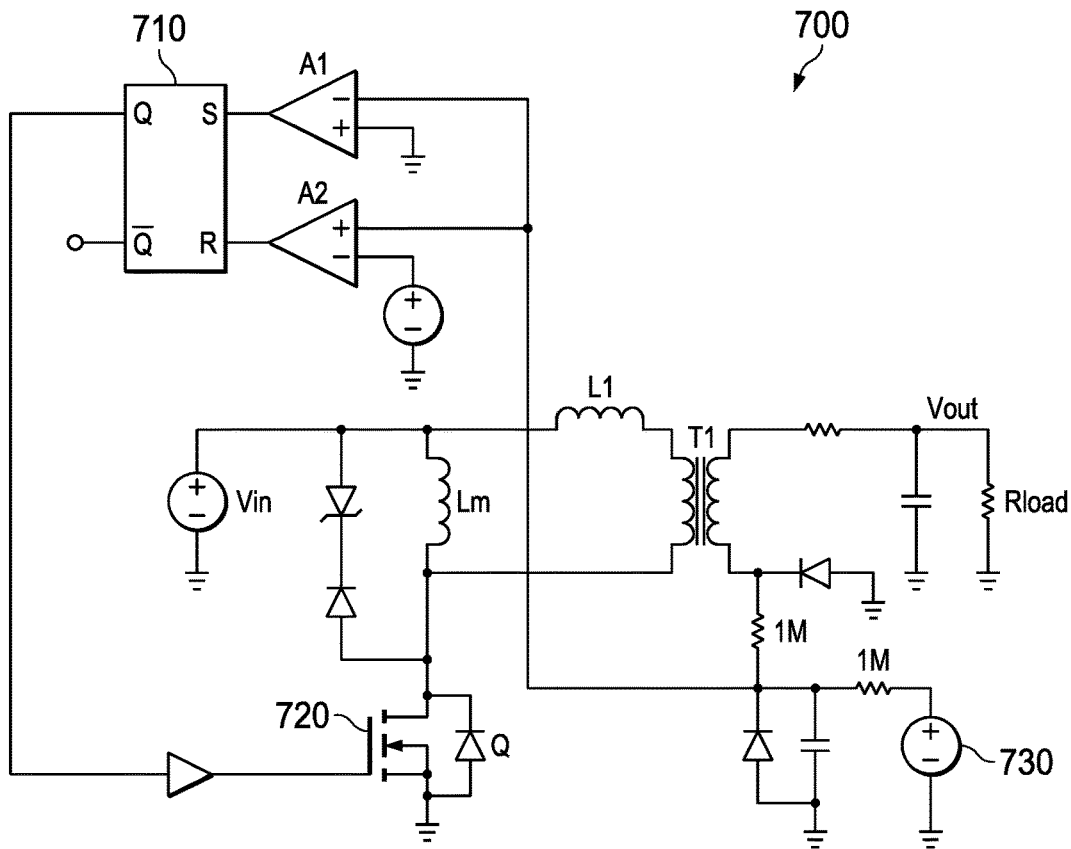
FIG. 7 illustrates an alternative example circuit implementation of a power supply circuit to regulate an output voltage based on pseudo current tracking of a current regulator.

FIG. 7 illustrates an alternative example circuit implementation of a power supply circuit 700 to regulate an output voltage based on pseudo current tracking of a current regulator. In this example, a boost or fly-back circuit is illustrated. Similar to the power supply circuits previously described, output from a control flip flop 710 drives a switch device 720 which in turn drives series inductors LM and L1 which are connected across a primary of a fly-back transformer T1. Output from the secondary of T1 drives one side of a coupling network having balanced 1 Meg ohm resistors. The other side of the coupling network is driven from VREF shown at 730. A pseudo current tracker C1 is provided to generate a ripple voltage waveform that is proportional to the ripple current waveform of L1 in the primary of T1. Similar to the circuits previously described, the output voltage is regulated by emulating the inductor current of L1 with the ripple voltage waveform generated by the PCT capacitor C1 which is fed to the inputs of comparators A1 and A2 to control the flip flop 710.

Figure 8:
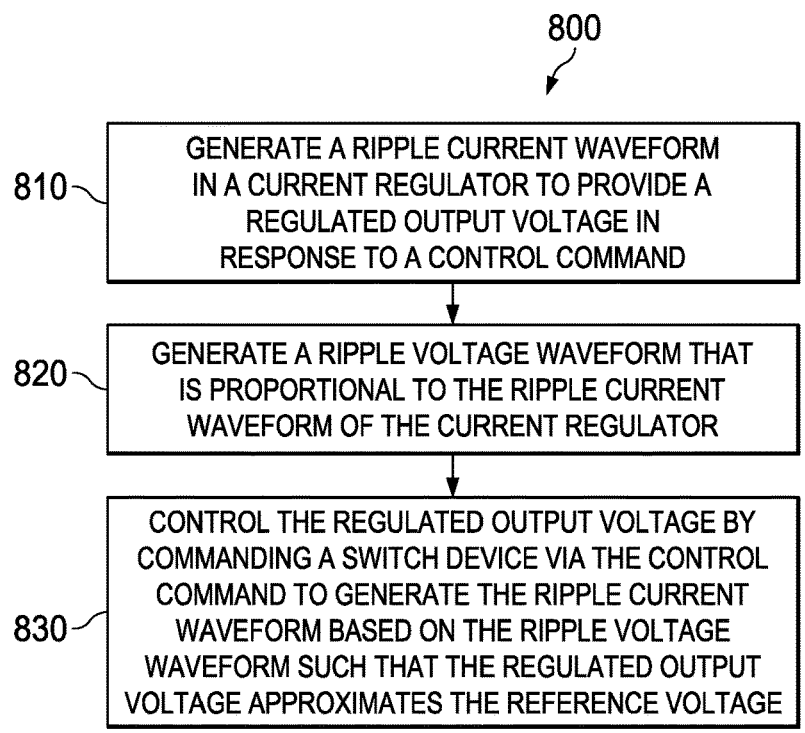
FIG. 8 illustrates an example method to regulate an output voltage based on pseudo current tracking of a current regulator.

In view of the foregoing structural and functional features described above, an example method will be better appreciated with reference to FIG. 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be implemented by various hardware circuits and other components configured to perform the functions shown and described.

FIG. 8 illustrates an example method 800 to regulate an output voltage based on pseudo current tracking of a current regulator. At 810, the method 800 includes generating a ripple current waveform in a current regulator to provide a regulated output voltage in response to a control command (e.g., via switch device 120 and current regulator 124 of FIG. 1). The ripple voltage waveform is proportional to the ripple current waveform if the regulated output voltage approximates the reference voltage and is not proportional if the regulated output voltage differs from the reference voltage. At 820, the method 800 includes generating a ripple voltage waveform that is proportional to the ripple current waveform of the current regulator (e.g., via pseudo current tracker 134 of FIG. 1). At 830, the method 800 includes controlling the regulated output voltage by commanding a switch device via the control command to generate the ripple current waveform based on the ripple voltage waveform such that the regulated output voltage approximates the reference voltage (e.g., via control circuit 130 of FIG. 1). Although not shown, the method 800 can also include commanding the switch device on if the ripple voltage waveform of the PCT has a slope that rises faster than a slope of the ripple current waveform and commanding the switch device off if the ripple voltage waveform of the PCT has a slope that rises slower than a slope of the ripple current waveform.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power supply circuit, comprising:
   a regulation circuit having an input terminal, first and second output terminals, a switch coupled to a ground terminal, an inductor coupled to the switch, and a rectifier coupled between the ground terminal and the second output terminal; and
   a control circuit having a reference voltage source coupled to the ground terminal, a pseudo current tracker (PCT) coupled to the ground terminal, a first resistor having a first end coupled to the second output terminal, and a second end, opposing the first end, coupled to the PCT, and a second resistor coupled between the reference voltage source and the PCT, and the control circuit having an output circuit coupled between the PCT and a gate of the switch.

2. The power supply circuit of claim 1, wherein the PCT has a capacitor including a first plate coupled to the ground terminal and a second plate coupled to the first and second resistors.

3. The power supply circuit of claim 1, wherein the rectifier includes a diode having an anode coupled to the second output terminal, and a cathode coupled to the ground terminal.

4. The power supply circuit of claim 1, the output circuit includes
   a first comparator having a first non-inverting input coupled to the PCT, a first inverting input coupled to a peak voltage source, and a first comparator output; and
   a second comparator having a second non-inverting input coupled to the ground terminal, a second inverting input coupled to the PCT, and a second comparator output.

5. The power supply circuit of claim 4, wherein the output circuit includes a flip flop having a set input coupled to the first comparator output, a reset input coupled to the second comparator output, and a non-inverting output coupled to the gate of the switch.

6. The power supply circuit of claim 4, wherein the output circuit includes:
   a third comparator having a third non-inverting input coupled to the ground terminal, a third inverting input coupled to the second output terminal, and a third comparator output;
   an AND gate having a first input coupled to the first comparator output, a second input coupled to the third comparator output, and a logic output; and
   a flip flop having a set input coupled to the logic output, a reset input coupled to the second comparator output, and a non-inverting output coupled to the gate of the switch.

7. The power supply circuit of claim 1, wherein the first resistor has a first resistance, and the second resistor has a second resistance equal to the first resistance.

8. The power supply circuit of claim 1, wherein the first resistor has a first resistance, and the second resistor has a second resistance different from the first resistance.

9. The power supply circuit of claim 1, wherein the PCT includes:
   a capacitor having a first plate coupled to the ground terminal and a second plate coupled to the first and second resistors; and
   a diode having an anode coupled to the ground terminal and a cathode coupled to the first and second resistors.

10. The power supply circuit of claim 1, wherein the regulation circuit includes a transformer having a primary side coupled to the inductor and a secondary side coupled to the first and second output terminals.

11. The power supply circuit of claim 1, wherein the inductor is coupled between the switch and the input terminal.

12. A power supply circuit, comprising:
   a regulation circuit having an input terminal, a ground terminal, and an output terminal, the regulation circuit including a switch coupled to the ground terminal, an inductor coupled to the output terminal, and a diode coupled to the ground terminal and the inductor; and
   a control circuit having:
      a capacitor including a first plate coupled to the ground terminal, and a second plate;
      a reference voltage source coupled to the ground terminal;
      a first resistor coupled between the diode and the second plate of the capacitor;
      a second resistor coupled between the reference voltage source and the second plate of the capacitor; and
      an output circuit coupled between the second plate of the capacitor and a gate of the switch.

13. The power supply circuit of claim 12, wherein the diode includes an anode coupled to the first resistor, and a cathode coupled to the ground terminal.

14. The power supply circuit of claim 12, wherein the diode includes an anode coupled to the ground terminal, and a cathode coupled to the first resistor.

15. The power supply circuit of claim 12, wherein the output circuit includes:
   a first comparator having a first non-inverting input coupled to the second plate of the capacitor, a first inverting input coupled to a peak voltage source, and a first comparator output; and
   a second comparator having a second non-inverting input coupled to the ground terminal, a second inverting input coupled to the second plate of the capacitor, and a second comparator output.

16. The power supply circuit of claim 15, wherein the output circuit includes a flip flop having a set input coupled to the first comparator output, a reset input coupled to the second comparator output, and a non-inverting output coupled to the gate of the switch.

17. The power supply circuit of claim 15, wherein the output circuit includes:
   a third comparator having a third non-inverting input coupled to the ground terminal, a third inverting input coupled to the second output terminal, and a third comparator output;
   an AND gate having a first input coupled to the first comparator output, a second input coupled to the third comparator output, and a logic output; and
   a flip flop having a set input coupled to the logic output, a reset input coupled to the second comparator output, and a non-inverting output coupled to the gate of the switch.

18. The power supply circuit of claim 12, wherein the first resistor has a first resistance, and the second resistor has a second resistance equal to the first resistance.

19. The power supply circuit of claim 12, wherein the first resistor has a first resistance, and the second resistor has a second resistance different from the first resistance.

20. The power supply circuit of claim 12, wherein the regulation circuit includes a transformer having a primary side and a secondary side having the inductor coupled to the output terminal.

* * * * *